US009684642B2

(12) United States Patent
Zhang et al.

(10) Patent No.: US 9,684,642 B2
(45) Date of Patent: Jun. 20, 2017

(54) METHOD AND DEVICE FOR UPDATING ELECTRONIC DOCUMENT AND ASSOCIATED DOCUMENT USE RECORDS

(71) Applicant: Xiaomi Inc., Beijing (CN)

(72) Inventors: Lei Zhang, Beijing (CN); Xiaolei Wang, Beijing (CN); Ruiheng Qiu, Beijing (CN); Dong Wang, Beijing (CN); Yi Wang, Beijing (CN)

(73) Assignee: Xiaomi Inc., Beijing (CN)

( * ) Notice: Subject to any disclaimer, the term of this patent is extended or adjusted under 35 U.S.C. 154(b) by 552 days.

(21) Appl. No.: 14/150,198

(22) Filed: Jan. 8, 2014

(65) Prior Publication Data

US 2014/0317494 A1    Oct. 23, 2014

Related U.S. Application Data

(63) Continuation of application No. PCT/CN2013/085980, filed on Oct. 25, 2013.

(30) Foreign Application Priority Data

Apr. 19, 2013 (CN) .......................... 2013 1 0139547

(51) Int. Cl.
*G06F 17/20* (2006.01)
*G06F 17/22* (2006.01)
(52) U.S. Cl.
CPC .............................. *G06F 17/2288* (2013.01)
(58) Field of Classification Search
CPC .................................................. G06F 17/2288
See application file for complete search history.

(56) References Cited

U.S. PATENT DOCUMENTS 5,604,853 A    2/1997  Nagashima
6,687,876 B1   2/2004  Schilit et al.
(Continued)

FOREIGN PATENT DOCUMENTS

CN    102184164 A    9/2011
CN    102385614 A    3/2012
(Continued)

OTHER PUBLICATIONS

International Search Report for PCT International Application No. PCT/CN2013/085980, from the State Intellectual Property Office of the P.R. China, dated Feb. 20, 2014.
(Continued)

*Primary Examiner* — Stephen Hong
*Assistant Examiner* — Shahid Khan
(74) *Attorney, Agent, or Firm* — Finnegan, Henderson, Farabow, Garrett & Dunner LLP (57) ABSTRACT

A method for a device to update an electronic document includes obtaining data update information and use record information of the electronic document, the data update information including a first position in the electronic document where an updating is to be performed, the use record information including a second position; determining whether the first position in the data update information is before the second position in the use record information; adjusting the use record information according to the data update information, if it is determined that the first position in the data update information is before the second position in the use record information; and updating the electronic document according to the data update information and the adjusted use record information.

18 Claims, 10 Drawing Sheets

(56) References Cited

U.S. PATENT DOCUMENTS

| | | | |
|---|---|---|---|
| 8,201,079 B2 | 6/2012 | Cragun et al. | |
| 2007/0061704 A1* | 3/2007 | Simova | G06F 17/241 715/210 |
| 2008/0222512 A1* | 9/2008 | Albornoz | G06F 17/30011 715/230 |

FOREIGN PATENT DOCUMENTS

| | | |
|---|---|---|
| CN | 102693233 A | 9/2012 |
| CN | 103257956 A | 8/2013 |
| EP | 2 541 433 | 1/2013 |
| JP | 7-152741 | 6/1995 |
| RU | 2010135522 | 2/2012 |
| WO | WO 2006051715 A1 | 5/2006 |
| WO | WO 2008/031625 A2 | 3/2008 |

OTHER PUBLICATIONS

Brush et al., Robust Annotation Positioning in Digital Documents, CHI 2001, vol. 3, Issue No. 1, pp. 285-292, dated Mar. 31, 2001.
Kahan, J. et al., Annotea: an open RDF infrastructure for shared Web annotations, Computer Networks Aug. 5, 2002, pp. 589-608, vol. 39.
Extended European Search Report of European Application No. 13882111.1, dated Nov. 18, 2016, issued by the European Patent Office.
Notification on Results of Invention Patentability Check of Russian Application No. 2015125070/08, mailed Oct. 14, 2016.

\* cited by examiner

The accompanying drawings, which are incorporated in and constitute a part of this specification, illustrate embodiments consistent with the invention and, together with the description, serve to explain the principles of the invention. ~501

Fig. 5

The accompanying drawings, which constitute a part of this specification, illustrate embodiments consistent with the invention and, together with the description, serve to explain the principles of the invention. ~601

Fig. 6

The accompanying drawings, which constitute a part of this specification, illustrate embodiments consistent with the invention and, together with the description, serve to explain the principles of the invention. ~501

METHOD AND DEVICE FOR UPDATING ELECTRONIC DOCUMENT AND ASSOCIATED DOCUMENT USE RECORDS

CROSS REFERENCE TO RELATED APPLICATIONS

The present application is a continuation of International Application No. PCT/CN2013/085980, filed Oct. 25, 2013, which is based upon and claims priority to Chinese Patent Application No. 201310139547.5, filed Apr. 19, 2013, the entire contents of which are incorporated herein by reference.

TECHNICAL FIELD

The present disclosure generally relates to the field of computer and communication technology and, more particularly, to a method and a device for updating an electronic document.

BACKGROUND

An electronic reading terminal is a device that presents an electronic document for a user to read. Conventionally, the electronic reading terminal provides record functions for the user to record or save certain use information, also known as use record information, such as a position in the electronic document where the user last stops reading, a bookmark, a book excerpt and the like.

The electronic document may be updated, e.g., by a publisher, after the use record information is recorded. Conventionally, the electronic reading terminal applies the original use record information to the updated electronic document. As a result, when the user reads the updated electronic document, the previous reading position, the bookmark, and the book excerpt may be misplaced.

SUMMARY

According to a first aspect of the present disclosure, there is provided a method for a device to update an electronic document, comprising: obtaining data update information and use record information of the electronic document, the data update information including a first position in the electronic document where an updating is to be performed, the use record information including a second position; determining whether the first position in the data update information is before the second position in the use record information; adjusting the use record information according to the data update information, if it is determined that the first position in the data update information is before the second position in the use record information; and updating the electronic document according to the data update information and the adjusted use record information.

According to a second aspect of the present disclosure, there is provided a device for updating an electronic document, comprising: a processor; and a memory for storing instructions executable by the processor, wherein the processor is configured to: obtain data update information and use record information of the electronic document, the data update information including a first position in the electronic document where an updating is to be performed, the use record information including a second position; determine whether the first position in the data update information is before the second position in the use record information; adjust the use record information according to the data update information, if it is determined that the first position in the data update information is before the second position in the use record information; and update the electronic document according to the data update information and the adjusted use record information.

According to a third aspect of the present disclosure, there is provided a non-transitory computer-readable medium having stored therein instructions that, when executed by a processor of a device, cause the device to perform a method for updating an electronic document, the method comprising: obtaining data update information and use record information of the electronic document, the data update information including a first position in the electronic document where an updating is to be performed, the use record information including a second position; determining whether the first position in the data update information is before the second position in the use record information; adjusting the use record information according to the data update information, if it is determined that the first position in the data update information is before the second position in the use record information; and updating the electronic document according to the data update information and the adjusted use record information.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
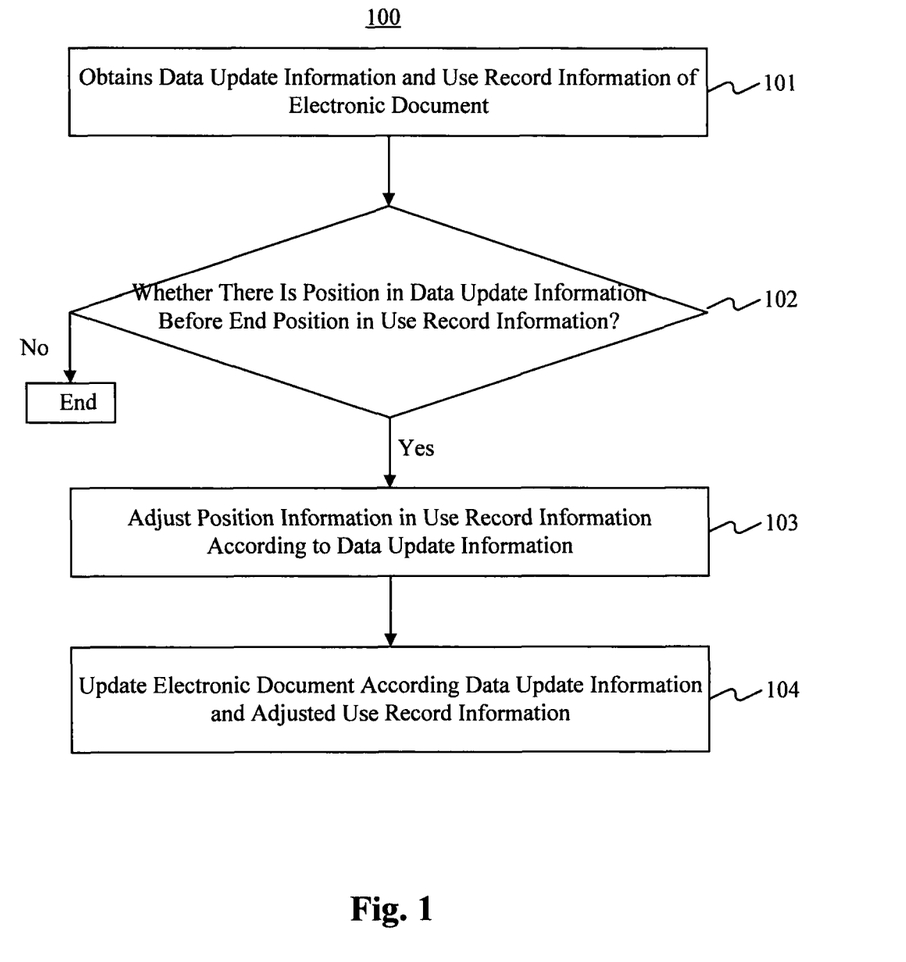
FIG. 1 is a flowchart of a method for a device to update an electronic document, according to an exemplary embodiment.

FIG. 1 is a flowchart of a method 100 for a device to update an electronic document, according to an exemplary embodiment. For example, the device may be an electronic reading terminal, a mobile phone, a tablet computer, etc. Referring to FIG. 1, the method 100 includes the following steps.

In step 101, the device obtains data update information and use record information of an electronic document. For example, the data update information includes data to update the electronic document and position information regarding where the updating is to be performed in the electronic document. Also for example, the use record information includes use information of the electronic document and corresponding position information, such as where in the electronic document a user last stops reading, a bookmark, a book excerpt and the like.

In step 102, the device determines whether there is a position in the data update information of the electronic document before an end position in the use record information. If it is determined that there is a position in the data update information before an end position in the use record information, the method proceeds to step 103; otherwise, the method 100 ends.

In step 103, the device adjusts the position information in the use record information according to the data update information, if it is determined that there is a position in the data update information before an end position in the use record information.

In step 104, the device updates the electronic document according to the data update information and the adjusted use record information.

In exemplary embodiments, the electronic document may have an epub format, a pdf format, a txt format, or the like, and is, e.g., downloaded from a server via a network. When the electronic document is published, an original version number is assigned to the electronic document. When the electronic document is updated due to, e.g., revisions or supplements, a new version number is assigned to the updated electronic document. A comparison is further performed based on, e.g., binary data, to obtain differences between the original electronic document and the updated electronic document at a binary level, and also to obtain one or more updating operations and a number of the updating operations. The obtained information is recorded in a file, referred to herein as a patch file. The patch file may also record the original version number and the updated version number corresponding to this update.

In one exemplary embodiment, the patch file includes a version number of the electronic document before updating, a version number of the electronic document after updating, an updating operation, updating contents, and the like. Each time the electronic document is updated, the updated version includes contents from all patch files of previous versions of the electronic document before the current updating and a patch file of the current updating.

In exemplary embodiments, the device records the use record information, such as the user's reading position, a bookmark, a book excerpt or the like, based on relative physical positions in the electronic document. For example, the last reading position is recorded based on a physical position of last displayed data the last time the electronic document is closed, and the book excerpt is recorded based on a physical position of content data corresponding to the book excerpt. The use record information may also include the version number of the electronic document. The relative physical position in the electronic document is represented by a value of a physical offset, e.g., an offset at the binary level, in the electronic document, which is usually independent of algorithms or software used by the device.

In exemplary embodiments, after receiving a message for updating the electronic document and relevant patch files, the device identifies one or more patch files to be executed according to the version number before updating and the version number after the updating, and sequentially executes each patch file from the oldest version to the newest version. For example, the device checks all the recorded use record information when executing each patch file, determines a new physical address in the electronic document according to the patch file, and updates the use record information accordingly.

In one exemplary embodiment, for each record in the use record information, the device obtains data update information relevant to position information in the use record information from all the identified patch files. The device further adjusts the use record information according to the obtained data update information, and updates the electronic document according to the data update information of the electronic document and the adjusted use record information.

In one exemplary embodiment, the position information in the use record information includes a start position and an end position. The data update information of the electronic document includes an operation type indicating an operation, such as an insert operation, a delete operation, and a move operation between chapters and the like.

Figure 2:
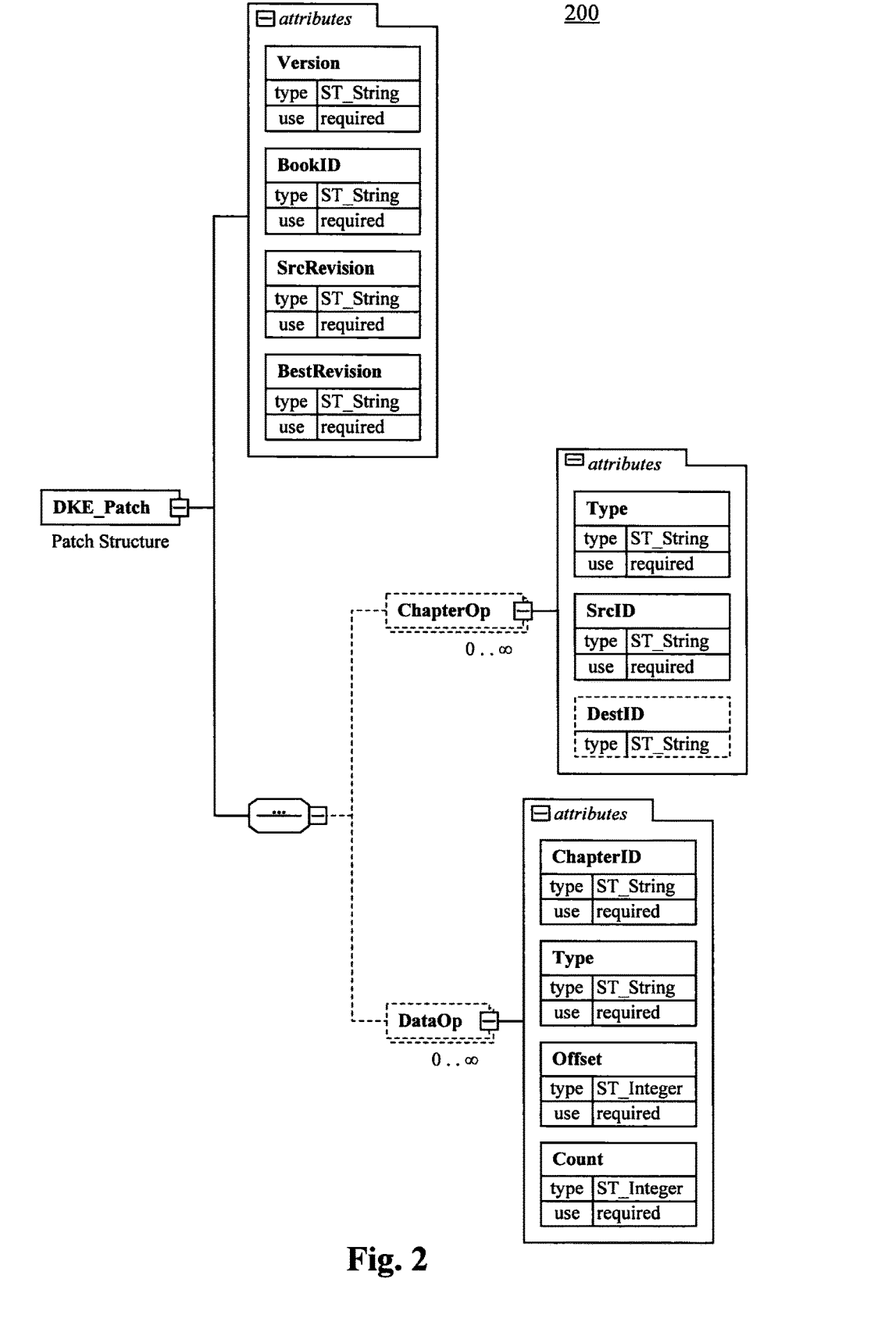
FIG. 2 is a diagram showing a structure of a patch file, according to an exemplary embodiment.

FIG. 2 is a diagram showing a structure of a patch file 200, according to an exemplary embodiment. In the illustrated embodiment, the patch file 200 is used for an epub document, and described by the Extensible Markup Language (XML) language. A description of the parameters in the patch file 200 is provided below in Table 1.

TABLE 1

| Name | Type | Note |
| --- | --- | --- |
| Version | ST_String (character) | Version number of patch file |
| BookID | ST_String | Unique identification of electronic document associated with patch file |
| SrcRevision | ST_String | Version number of electronic document before applying patch file |
| DestRevision | ST_String | Version number of electronic document after applying patch file |
| ChapterOp | | Revision operation at chapter level |
| DataOp | | Revision operation to data within chapter |

In Table 1, the ChapterOp parameter records all revision operations relating to the chapter level, and attributes of the ChapterOp parameter are defined as Table 2 below.

TABLE 2

| Name | Type | Note |
| --- | --- | --- |
| Type | ST_String | Operator type, with optional values of Insert, Delete and Move, as described below: Insert - insert chapter designated by SrcID after chapter designated by DestID, and if no DestID |

TABLE 2-continued

| Name | Type | Note |
| --- | --- | --- |
| | | attribute, insert chapter designated by SrcID as first chapter.<br>Delete - delete chapter designated by SrcID.<br>Move - move chapter designated by SrcID after chapter designated by DesID, and if no DestID attribute, move chapter designated by SrcID as first chapter |
| SrcID | ST_String | Operation parameter |
| DestID | ST_String | (Optional) operation parameter |

In Table 1, the DataOp parameter records data revision operations within a chapter, and attributes of the DataOp parameter are defined as Table 3 below.

TABLE 3

| Name | Type | Note |
| --- | --- | --- |
| ChapterID | ST_String | ID of destination chapter |
| Type | ST_String | Operator type, with optional values of Insert and Delete, as described below:<br>Insert - insert data of Count bytes at Offset position<br>Delete - delete data of Count bytes from Offset position |
| Offset | ST_Integer (value) | Operation parameter |
| Count | ST_Integer | Operation parameter |

In exemplary embodiments, if it is determined that a start position in the data update information of the electronic document is before a start position in the use record information, and an end position in the data update information is before an end position in the use record information, the device adjusts the start position and the end position in the use record information according to the data update information. Alternatively, if it is determined that the start position in the data update information of the electronic document is between the start position and the end position in the use record information, the device adjusts the end position in the use record information according to the data update information.

Figure 3:
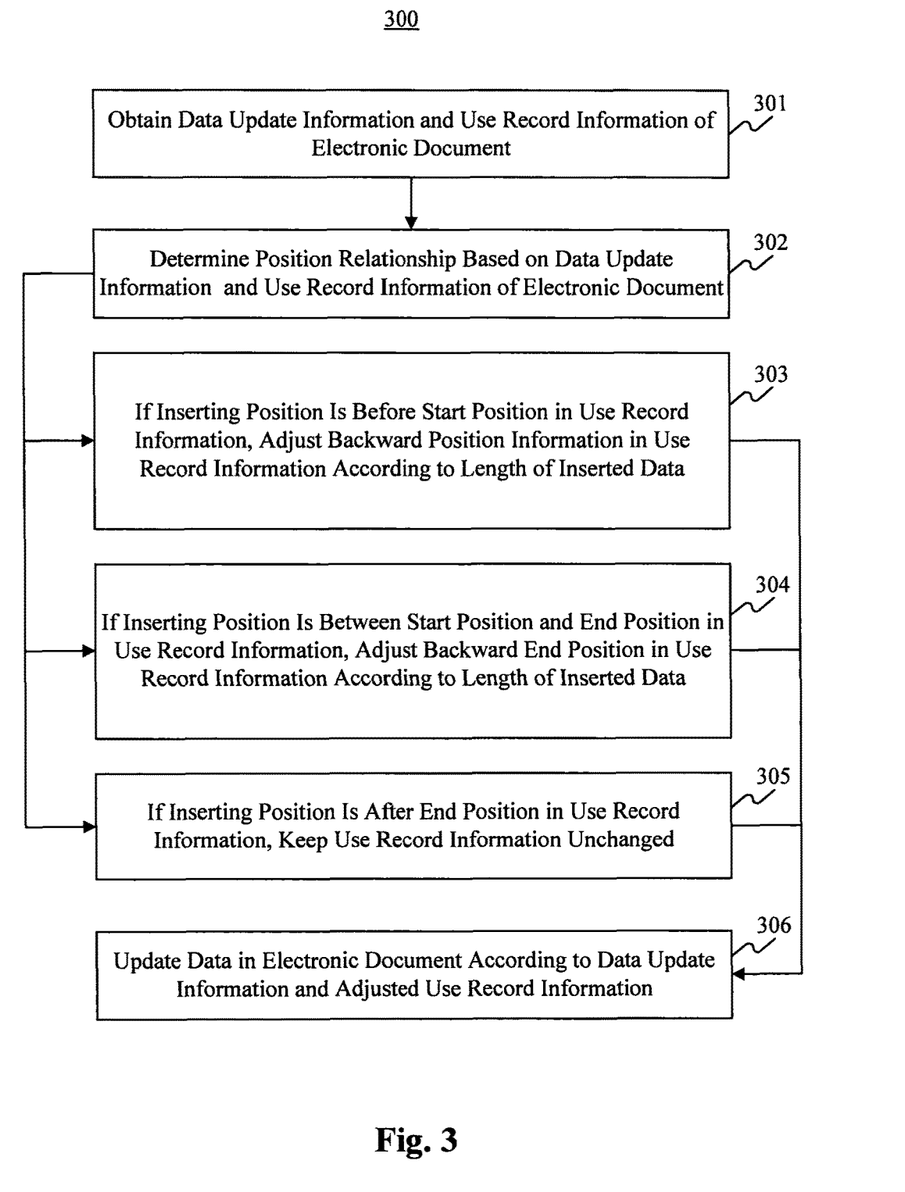
FIG. 3 is a flowchart of a method for a device to update an electronic document, according to an exemplary embodiment.

FIG. 3 is a flowchart of a method 300 for a device to update an electronic document, according to an exemplary embodiment. Referring to FIG. 3, the method 300 includes the following steps.

In step 301, the device obtains data update information and use record information of the electronic document, the data update information indicating an insert operation to be performed on the electronic document and including position information regarding where the insert operation is to be performed.

In step 302, the device determines a position relationship based on the data update information and the use record information of the electronic document, and then proceeds to one of steps 303, 304 or 305 based on the determination.

In step 303, if the device determines that an inserting position in the data update information is before a start position in the use record information, the device adjusts backward position information in the use record information according to a length of inserted data in the data update information of the electronic document, and then proceeds to step 306. In the illustrated embodiment, the start position and the end position in the data update information of the electronic document correspond to the same position, since an insert operation is to be performed. The position information in the use record information includes the start position and an end position, and if the use record information is for a single position, such as a bookmark, the start position and the end position in the use record information correspond to the same position.

In step 304, if the device determines that the inserting position in the data update information is between the start position and the end position in the use record information, the device adjusts backward the end position in the use record information according to the length of inserted data in the data update information. For example, step 304 is performed when the use record information includes the start and end positions for a book excerpt. The device then proceeds to step 306.

In step 305, if the device determines that the inserting position in the data update information is after the end position in the use record information, the device keeps the use record information unchanged. The device then proceeding to step 306.

In step 306, the device updates the electronic document according to the data update information and the adjusted use record information.

Figure 4:
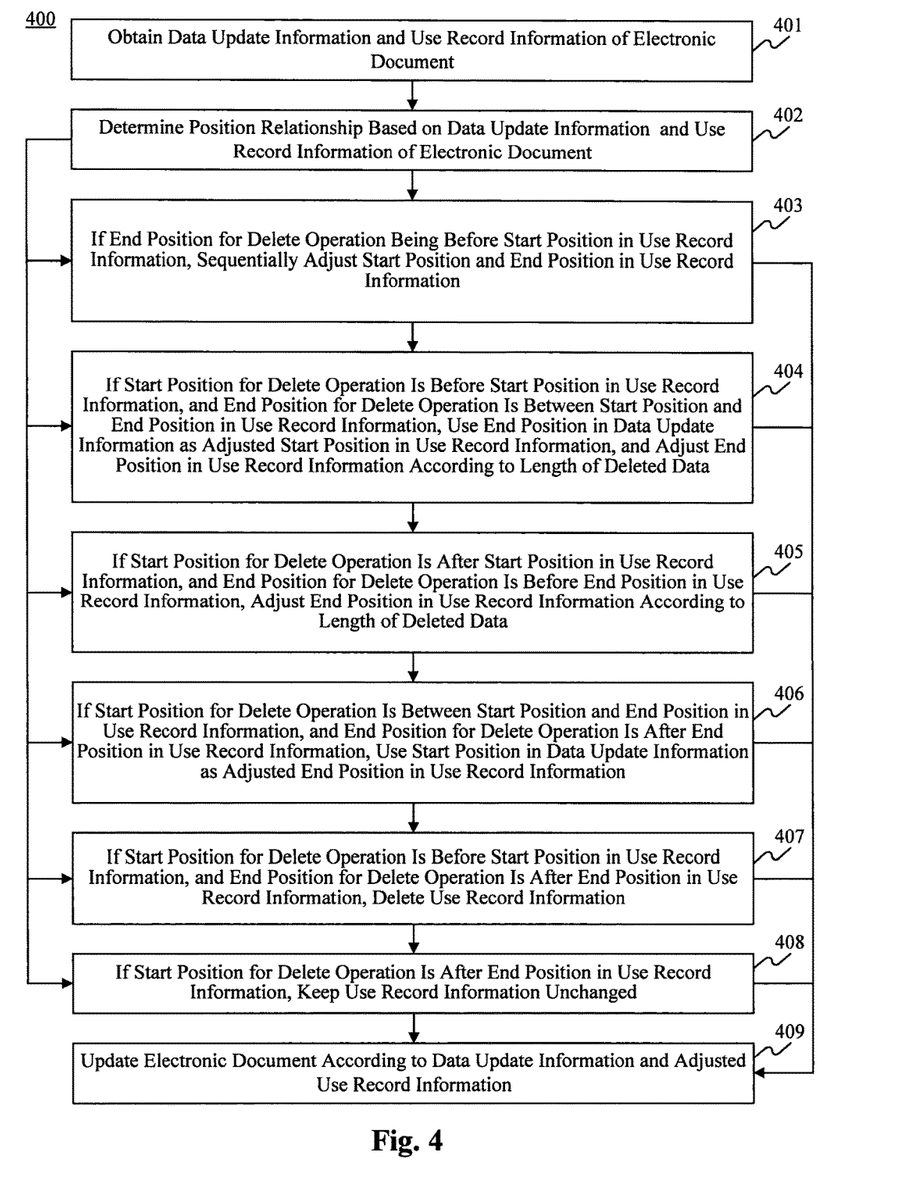
FIG. 4 is a flowchart of a method for a device to update an electronic document, according to an exemplary embodiment.

FIG. 4 is a flowchart of a method 400 for updating data in an electronic document, according to an exemplary embodiment. Referring to FIG. 4, the method 400 includes the following steps.

In step 401, the device obtains data update information and use record information of the electronic document, the data update information indicating a delete operation to be performed on the electronic document and including position information regarding where the delete operation is be performed.

In step 402, the device determines a position relationship based on the data update information and the use record information of the electronic document, and then proceeds to one of steps 403 to 408 based on the determination.

In step 403, if the device determines that an end position for the delete operation in the data update information is before a start position in the use record information, the device sequentially adjusts the start position and an end position in the use record information. For example, the device adjusts forwards the start position and the end position in the data update information according to a length of deleted data, and proceeds to step 409.

In step 404, if the device determines that a start position for the delete operation in the data update information is before the start position in the use record information, and the end position for the delete operation is between the start position and the end position in the use record information, the device uses the end position in the data update information of the electronic document as the adjusted start position in the use record information, and adjusts the end position in the use record information according to the length of deleted data in the data update information of the electronic document. In one exemplary embodiment, step 404 is performed when the use record information includes the start and end positions for a book excerpt. The device then proceeds to step 409.

In step 405, if the device determines that the start position in the data update information is after the start position in the use record information, and the end position for the delete operation is before the end position in the use record information, the device adjusts the end position in the use record information according to the length of deleted data in the data update information, by adjusting forward the end position in the use record information according to the length of deleted data in the data update information. In one exemplary embodiment, step 405 is performed when the use record information includes the start and end positions for a book excerpt. The device then proceeds to step 409.

In step 406, if the device determines that the start position in the data update information is between the start position and the end position in the use record information, and the end position for the delete operation is after the end position in the use record information, the device uses the start position in the data update information as the adjusted end position in the use record information. In one exemplary embodiment, step 406 is performed when the use record information includes the start and end positions for a book excerpt. The device then proceeds to step 409.

In step 407, if the device determines that the start position in the data update information is before the start position in the use record information, and the end position for the delete operation is after the end position in the use record information, the device deletes the use record information, and then proceeds to step 409.

In step 408, if the device determines that the start position in the data update information of the electronic document is after the end position in the use record information, the device keeps the use record information unchanged, and then proceeds to step 409.

In step 409, the device updates the electronic document according to the data update information of the electronic document and the adjusted use record information.

Figure 5:
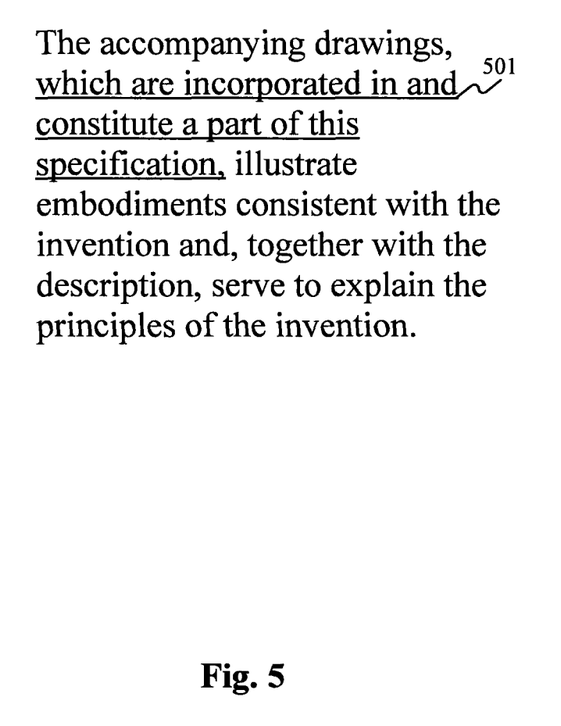
FIGS. 5 and 6 illustrate an example for a device to implement the method illustrated in connection with FIG. 4, according to an exemplary embodiment.
Figure 6:
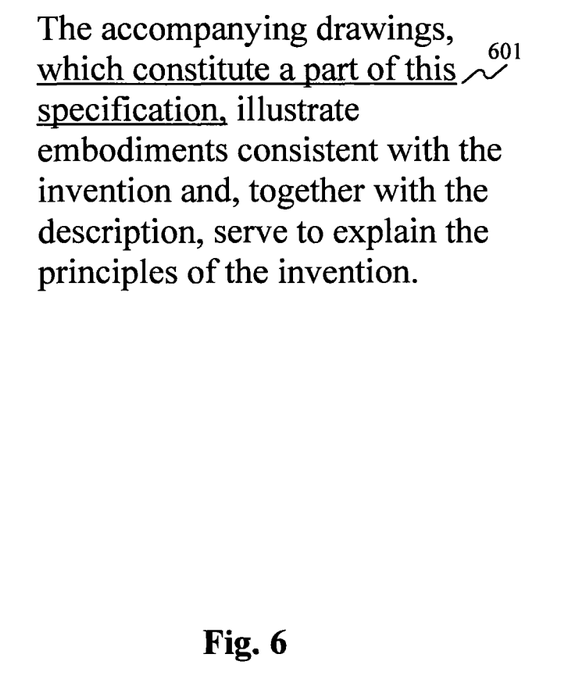

FIGS. 5 and 6 illustrate an example for the device to implement the method 400 (FIG. 4), according to an exemplary embodiment. For illustrative purposes, only one paragraph in an electronic document displayed on the device is shown in FIGS. 5 and 6. Referring to FIG. 5, in the illustrated embodiment, the user adds in the paragraph a book excerpt, marked by an underline 501, from a first position to a second position. The first position corresponds to a physical position of the word "which" in the electronic document, and the second position corresponds to a physical position of the symbol "," in the electronic document. Accordingly, the device records the first and second positions for the book excerpt as use record information.

Figure 7:
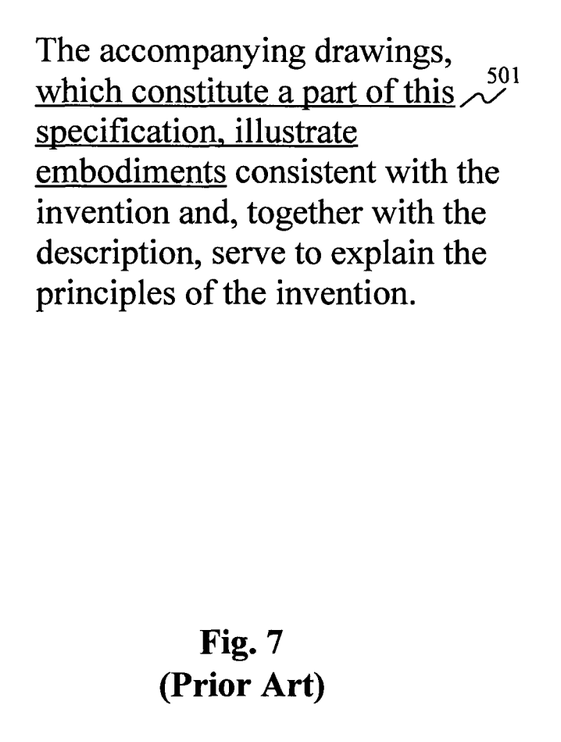
FIG. 7 shows an updated paragraph in an electronic document and a book excerpt based on a conventional method.

In one exemplary embodiment, the electronic document is updated, and the phrase "are incorporated in and" in the book excerpt is deleted. A patch file indicating the deleting from a physical position of the word "are," represented by a parameter DeleteStart, to a physical position of the word "and" represented by a parameter DeleteEnd, is sent to the device. Accordingly, based on the method 400 (FIG. 4), the device updates the electronic document and associated data, including updating the end position of the book excerpt to be the result of DeleteEnd-DeleteStart. FIG. 6 shows an updated paragraph and an updated book excerpt, marked by an underline 601, after the updating based on the method 400 (FIG. 4). FIG. 7 shows the updated paragraph and the book excerpt represented by the underline 501 after the updating based on a conventional method. As shown in FIG. 7, based on the conventional method, the book excerpt is inaccurate for the updated paragraph.

Figure 8:
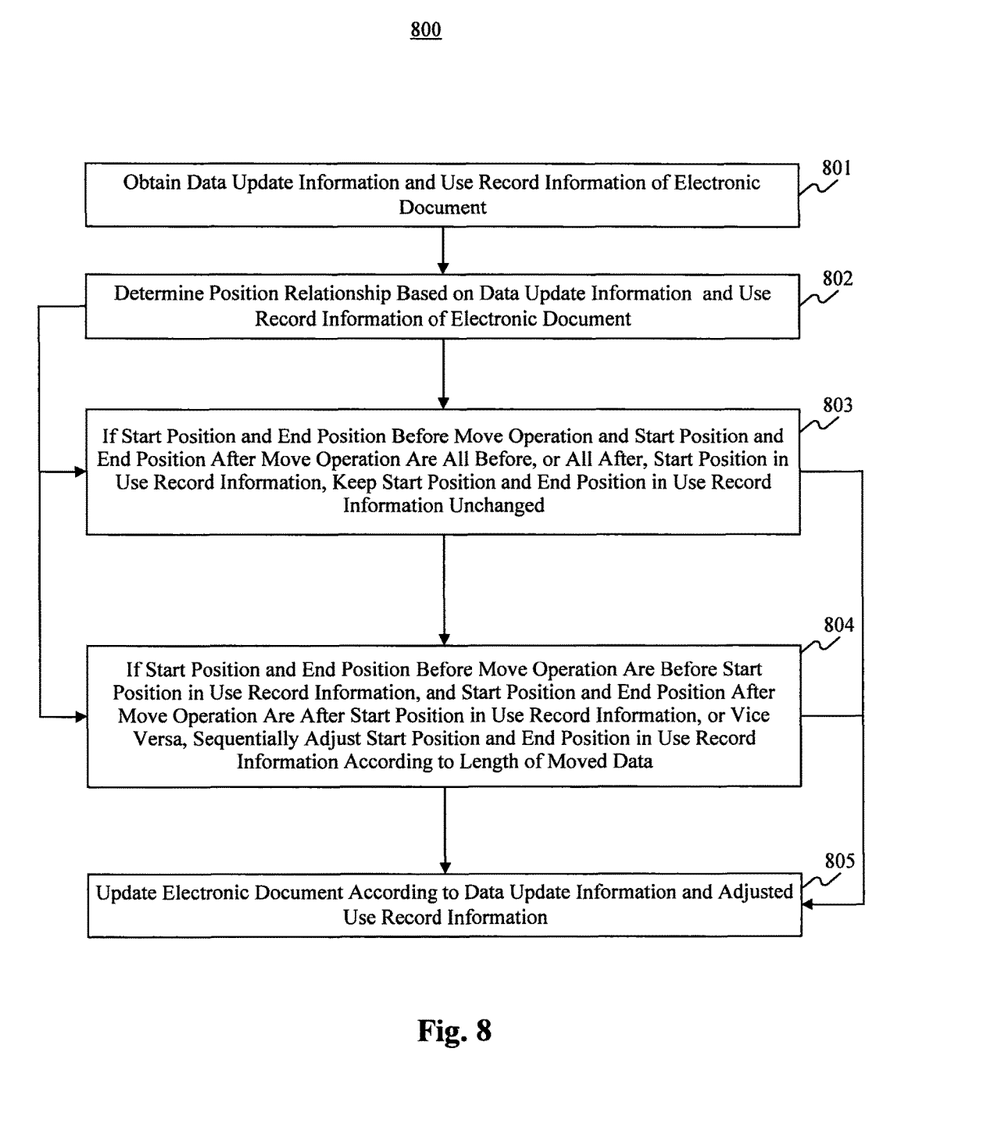
FIG. 8 is a flowchart of a method for a device to update an electronic document, according to an exemplary embodiment.

FIG. 8 is a flowchart of a method 800 for a device to update data in an electronic document, according to an exemplary embodiment. Referring to FIG. 8, the method 800 includes the following steps.

In step 801, the device obtains data update information and use record information of the electronic document, the data update information indicating a move operation to be performed on the electronic document and including position information for, e.g., a chapter, before and after the move operation.

In step 802, the device determines a position relationship based on the data update information and the use record information of the electronic document, and then proceeds to one of steps 803 or 804 based on the determination.

In step 803, if the device determines that a start position and an end position before the move operation and a start position and an end position after the move operation in the data update information are all before, or all after, a start position in the use record information, the device keeps the start position and an end position in the use record information unchanged, and then proceeds to step 805.

In the illustrated embodiment, the move operation is performed on the whole chapter in the electronic document. Therefore, the start position and the end position before the move operation as well as the start position and the end position after the move operation would not fall between the start position and the end position in the use record information.

In step 804, if the device determines that the start position and the end position before the move operation in the data update information are before the start position in the use record information, and the start position and the end position after the move operation are behind the end position in the use record information, or determines that the start position and the end position before the move operation are after the end position in the use record information, and the start position and the end position after the move operation are before the start position in the use record information, the device sequentially adjusts the start position and the end position in the use record information according to a length of moved data in the data update information, and then proceeds to step 805.

In step 805, the device updates the electronic document according to the data update information and the adjusted use record information.

Figure 9:
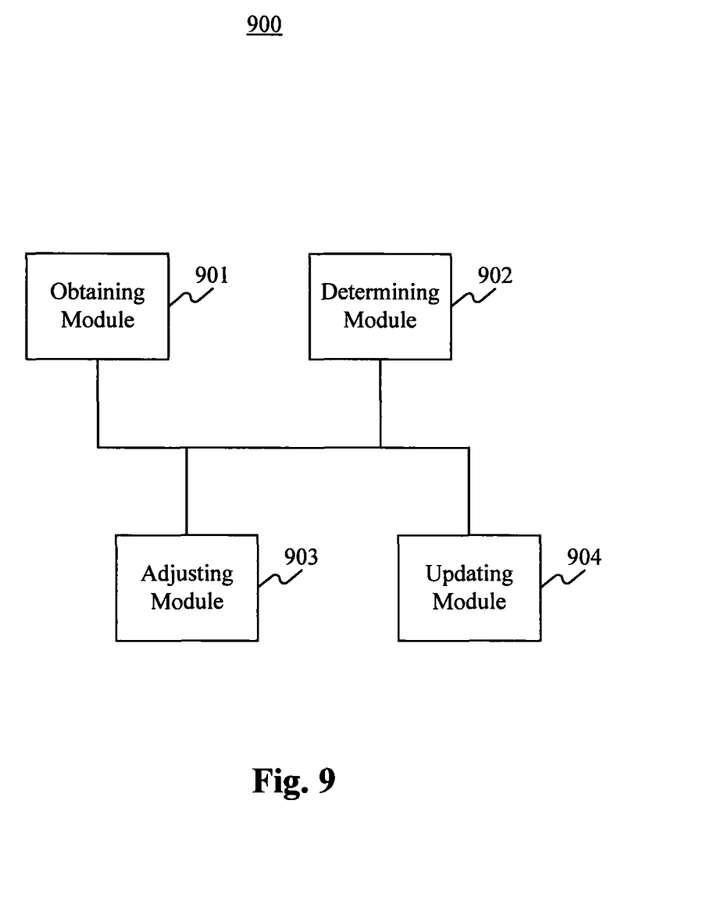
FIG. 9 is a block diagram of a device for updating an electronic document, according to an exemplary embodiment.

FIG. 9 is a block diagram of a device 900 for updating an electronic document, according to an exemplary embodiment. For example, the device 900 may be the device described above in connection with FIGS. 1-6 and 8. Referring to FIG. 9, the device 900 includes an obtaining module 901, a determining module 902, an adjusting module 903, and an updating module 904.

In exemplary embodiments, the obtaining module 901 is configured to obtain data update information and use record information of an electronic document. The determining module 902 is configured to determine whether there is a position in the data update information before an end position in the use record information. The adjusting module 903 is configured to adjust position information in the use record information according to the data update information, if it is determined that there is a position in the data update information before the end position in the use record information. The updating module 904 is configured to update the electronic document according to the data update information and the adjusted use record information.

One of ordinary skill in the art will understand that the above described modules can each be implemented by hardware, or software, a combination of hardware and software. One of ordinary skill in the art will also understand that multiple ones of the above described modules may be combined as one module, and each of the above described modules may be further divided into a plurality of submodules.

Figure 10:
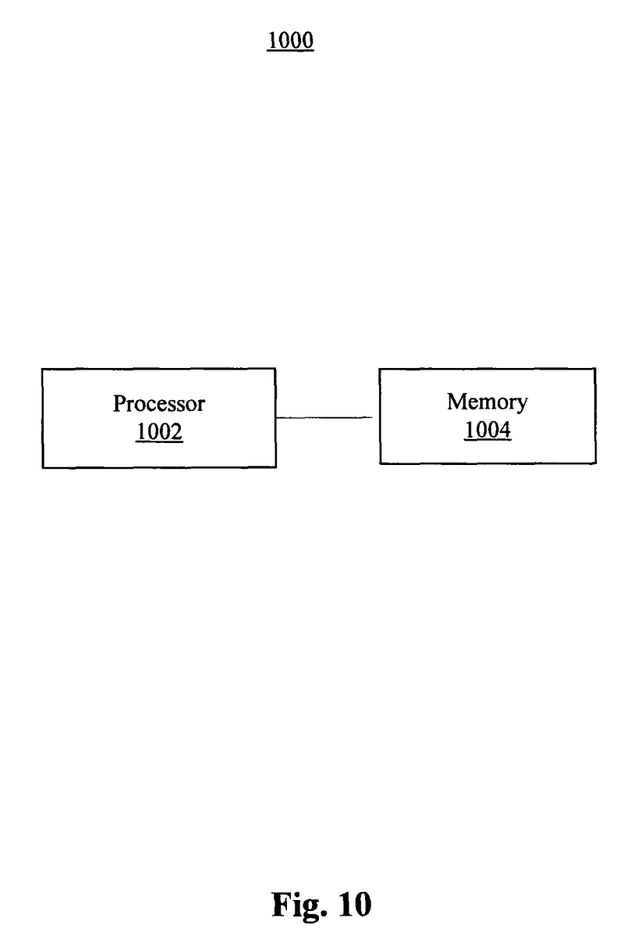
FIG. 10 is a block diagram of a device for updating an electronic document, according to an exemplary embodiment.

FIG. 10 illustrates a block diagram of a device 1000 for updating data in the electronic document, according to an exemplary embodiment. For example, the device 1000 may be the device described above in connection with FIGS. 1-6, 8, and 9. Referring to FIG. 10, the device 1000 includes a processor 1002 configured to execute program instructions to perform the above described methods for updating data in the electronic document, and a memory 1004 configured to store information and program instructions.

In exemplary embodiments, there is also provided a non-transitory computer-readable medium including instructions, such as included in the memory 1004, executable by the processor 1002 in the device 1000, for performing the above described methods for updating an electronic document.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for a device to update an electronic document, comprising:
    obtaining data update information and use record information of the electronic document, the data update information including a first position in the electronic document where an updating is to be performed, the use record information including a second position;
    determining whether the first position in the data update information is before the second position in the use record information;
    adjusting the use record information according to the data update information, if it is determined that the first position in the data update information is before the second position in the use record information; and
    updating the electronic document according to the data update information and the adjusted use record information,
    wherein when the data update information indicates a delete operation and includes a start position and an end position for the delete operation, and the use record information includes a start position and an end position, the method further comprising, in response to determining that the start position in the data update information is before the start position in the use record information, and the end position in the data update information is between the start position and the end position in the use record information:
        using the end position in the data update information as an adjusted start position in the use record information; and
        adjusting the end position in the use record information according to a length of deleted data in the data update information.

2. The method according to claim 1, wherein when the data update information indicates an insert operation, and the use record information includes a start position and an end position, the method further comprising, in response to determining that the first position in the data update information is before the start position in the use record information:
    adjusting the start position and the end position in the use record information according to the data update information.

3. The method according to claim 1, wherein when the data update information indicates an insert operation, and the use record information includes a start position and an end position, the method further comprising, in response to determining that the first position in the data update information is between the start position and the end position in the use record information:
    adjusting the end position in the use record information according to the data update information.

4. The method according to claim 1, wherein when the data update information indicates a delete operation and includes a start position and an end position for the delete operation, and the use record information includes a start position and an end position, the method further comprising, in response to determining that the end position in the data update information is before the start position in the use record information:
    sequentially adjusting the start position and the end position in the use record information.

5. The method according to claim 1, wherein when the data update information indicates a delete operation and includes a start position and an end position for the delete operation, and the use record information includes a start position and an end position, the method further comprising, in response to determining that the start position in the data update information is after the start position in the use record information, and the end position in the data update information of the electronic document is before the end position in the use record information:
    adjusting the end position in the use record information according to a length of deleted data in the data update information.

6. The method according to claim 1, wherein when the data update information indicates a delete operation and includes a start position and an end position for the delete operation, and the use record information includes a start position and an end position, the method further comprising, in response to determining that the start position in the data update information is between the start position and the end position in the use record information, and the end position in the data update information of the electronic document is after the end position in the use record information:
    using the start position in the data update information of the electronic document as the adjusted end position in the use record information.

7. The method according to claim 1, wherein when the data update information indicates a delete operation and includes a start position and an end position for the delete operation, and the use record information includes a start position and an end position, the method further comprising, in response to determining that the start position in the data update information is before the start position in the use record information, and the end position in the data update information is after the end position in the use record information:
    deleting the use record information.

8. The method according to claim 1, wherein when the data update information indicates a move operation, a first start position and a first end position before updating, and a second start position and a second end position after the updating, the method further comprising, in response to determining that the first start position and the first end position before the updating and the second start position and the second end position after the updating are all before, or all after, the start position in the use record information:
    keeping the start position and the end position in the use record information unchanged.

9. The method according to claim 1, wherein when the data update information indicates a move operation, a first start position and a first end position before updating, and a second start position and a second end position after the updating, the method further comprising, in response to determining one of that the first start position and the first end position before the updating in the data update information are before the start position in the use record information, and the second start position and the second end position after the updating in the data update information are after the end position in the use record information, or that the first start position and the first end position before the updating in the data update information are after the end position in the use record information, and the second start position and the second end position after the updating in the data update information are before the start position in the use record information:
    sequentially adjusting the start position and the end position in the use record information according to a length of moved data in the data update information.

10. The method according to claim 1, wherein the obtaining of the data update information includes obtaining all versions of the data update information, the adjusting comprising:
    adjusting the use record information according to a time order of the versions of the data update information.

11. A device for updating an electronic document, comprising:
    a processor; and
    a memory for storing instructions executable by the processor,
    wherein the processor is configured to:
        obtain data update information and use record information of the electronic document, the data update information including a first position in the electronic document where an updating is to be performed, the use record information including a second position;
        determine whether the first position in the data update information is before the second position in the use record information;
        adjust the use record information according to the data update information, if it is determined that the first position in the data update information is before the second position in the use record information; and
        update the electronic document according to the data update information and the adjusted use record information,
    wherein when the data update information indicates a delete operation and includes a start position and an end position for the delete operation, and the use record information includes a start position and an end position, the processing is further configured to, in response to determining that the start position in the data update information is before the start position in the use record information, and the end position in the data update information is between the start position and the end position in the use record information:
        use the end position in the data update information as an adjusted start position in the use record information; and adjust the end position in the use record information according to a length of deleted data in the data update information.

12. The device according to claim 11, wherein when the data update information indicates an insert operation, and the use record information includes a start position and an end position, the processor is further configured to, in response to determining that the first position in the data update information is before the start position in the use record information:
    adjust the start position and the end position in the use record information according to the data update information.

13. The device according to claim 11, wherein when the data update information indicates an insert operation, and the use record information includes a start position and an end position, the processor is further configured to, in response to determining that the first position in the data update information is between the start position and the end position in the use record information:
    adjust the end position in the use record information according to the data update information.

14. The device according to claim 11, wherein when the data update information indicates a delete operation and includes a start position and an end position for the delete operation, and the use record information includes a start position and an end position, the processor is further configured to, in response to determining that the end position in the data update information is before the start position in the use record information:
    sequentially adjust the start position and the end position in the use record information.

15. The device according to claim 11, wherein when the data update information indicates a delete operation and includes a start position and an end position for the delete operation, and the use record information includes a start position and an end position, the processor is further configured to, in response to determining that the start position in the data update information is after the start position in the use record information, and the end position in the data update information of the electronic document is before the end position in the use record information:
    adjust the end position in the use record information according to a length of deleted data in the data update information.

16. The device according to claim 11, wherein when the data update information indicates a delete operation and includes a start position and an end position for the delete operation, and the use record information includes a start position and an end position, the processor is further configured to, in response to determining that the start position in the data update information is between the start position and the end position in the use record information, and the end position in the data update information of the electronic document is after the end position in the use record information:
    use the start position in the data update information of the electronic document as an adjusted end position in the use record information.

17. The device according to claim 11, wherein when the data update information indicates a delete operation and includes a start position and an end position for the delete operation, and the use record information includes a start position and an end position, the processor is further configured to, in response to determine that the start position in the data update information is before the start position in the use record information, and the end position in the data update information is after the end position in the use record information:

delete the use record information.

18. A non-transitory computer-readable medium having stored therein instructions that, when executed by a processor of a device, cause the device to perform a method for updating an electronic document, the method comprising:

obtaining data update information and use record information of the electronic document, the data update information including a first position in the electronic document where an updating is to be performed, the use record information including a second position;

determining whether the first position in the data update information is before the second position in the use record information;

adjusting the use record information according to the data update information, if it is determined that the first position in the data update information is before the second position in the use record information; and updating the electronic document according to the data update information and the adjusted use record information, wherein when the data update information indicates a delete operation and includes a start position and an end position for the delete operation, and the use record information includes a start position and an end position, the method further comprising, in response to determining that the start position in the data update information is before the start position in the use record information, and the end position in the data update information is between the start position and the end position in the use record information:

using the end position in the data update information as an adjusted start position in the use record information; and adjusting the end position in the use record information according to a length of deleted data in the data update information.

* * * * *